Figure 1:
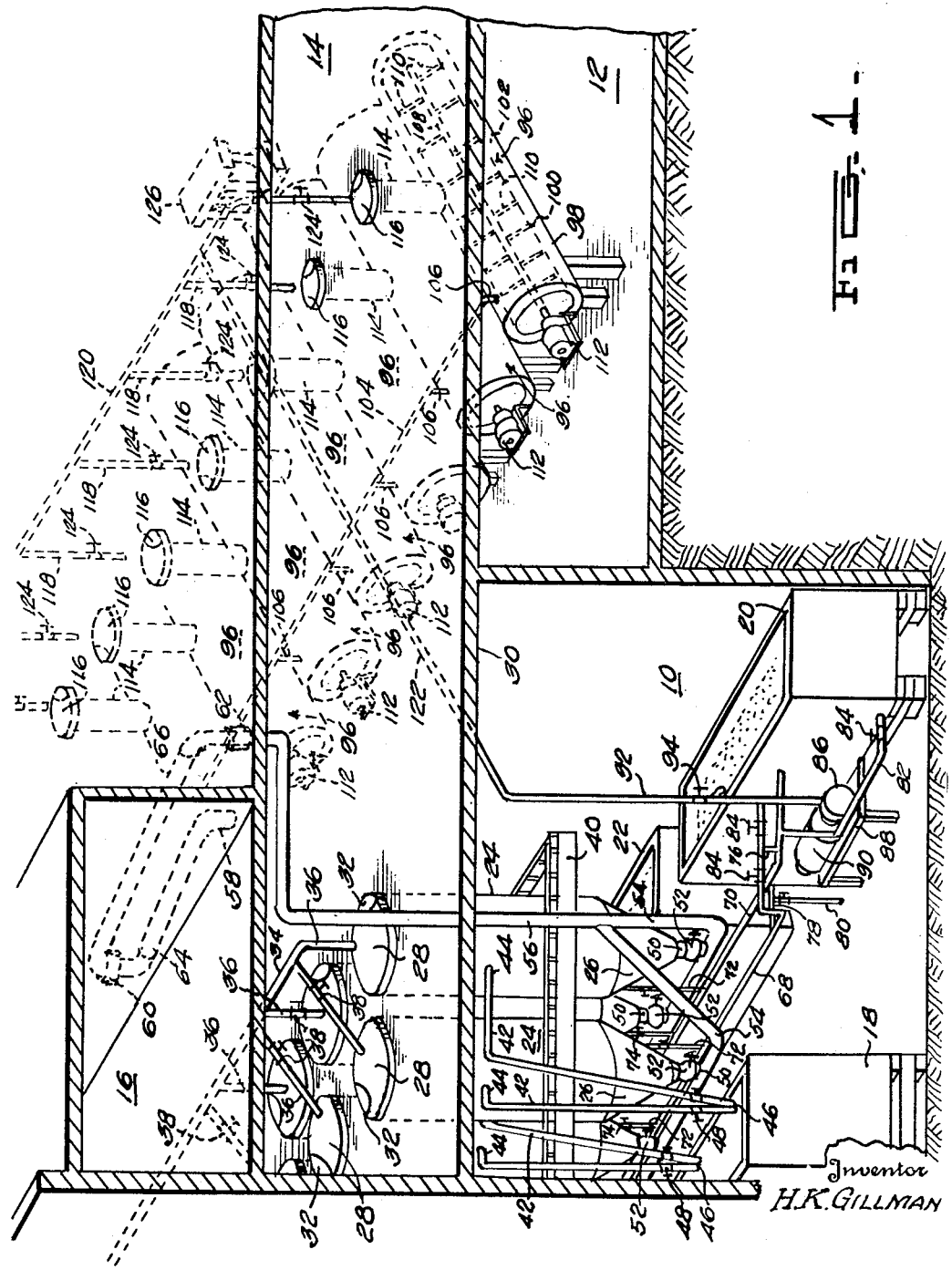

Oct. 10, 1950

H. K. GILLMAN 2,525,293

TREATMENT OF MEAT PACKING HOUSE PRODUCTS

Filed Oct. 5, 1948

2 Sheets-Sheet 1

Inventor
H. K. GILLMAN

By
Parker and Walsh
ATTORNEYS

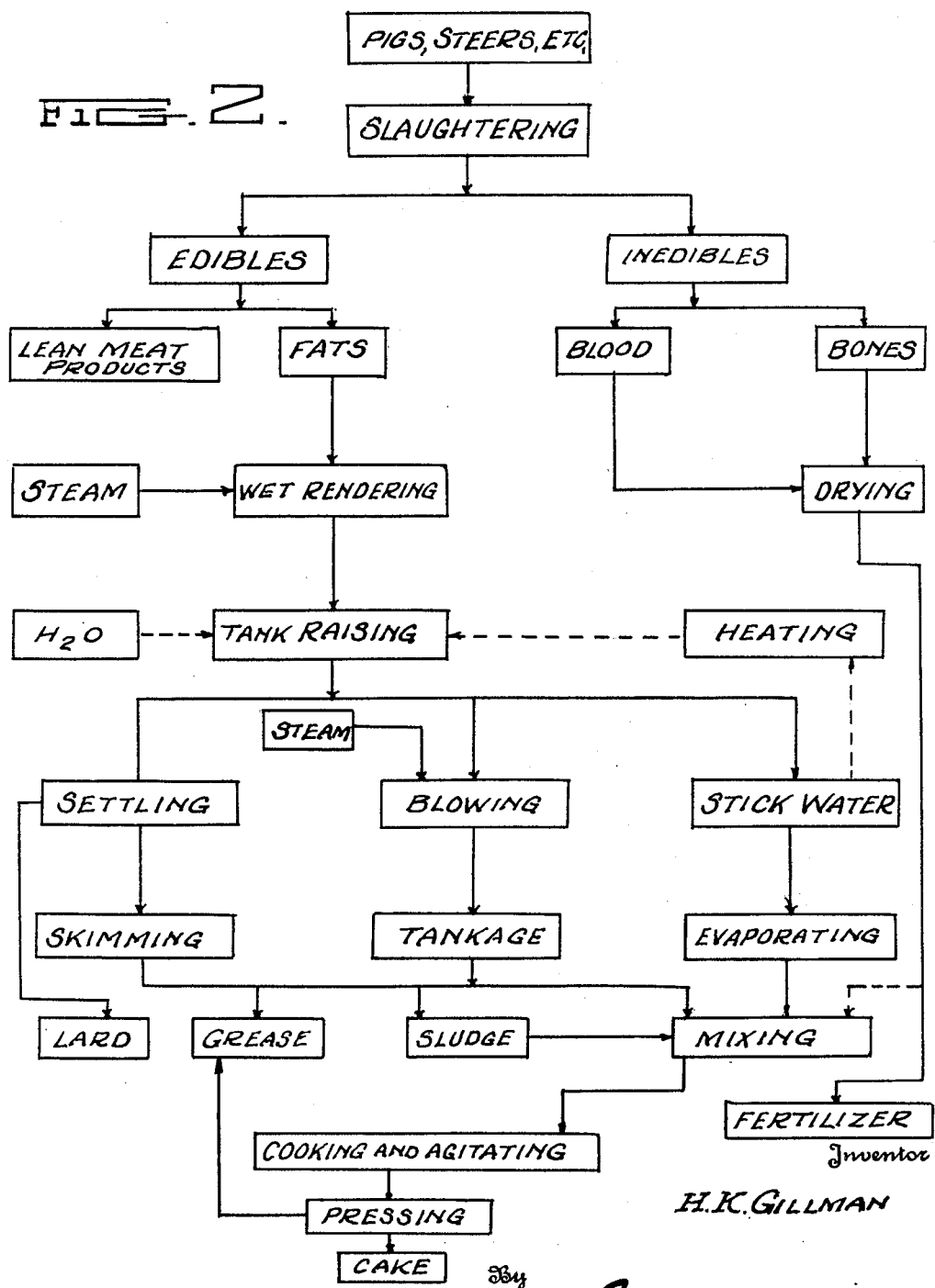

Patented Oct. 10, 1950

2,525,293

UNITED STATES PATENT OFFICE 2,525,293

TREATMENT OF MEAT PACKING HOUSE PRODUCTS

Harold K. Gillman, Fort Dodge, Iowa

Application October 5, 1948, Serial No. 52,911

12 Claims. (Cl. 99—2)

The present invention relates generally to the treatment of meat packing house products.

More particularly, this invention relates to an improved method of treating the residual by-products obtained in the manufacture of lard from animal fats.

In the meat packing industry, the principal products derived from the operation of a packing house are, of course, the finished meat products such as prepared raw cuts largely comprising lean meat, as well as various cooked or smoked items including hams, frankfurters, bologna, salami, sausage and numerous other products. However, in addition to the primary products of a packing house, there are usually numerous by-products, and where a relatively large amount of fat is produced in the form of scraps and trimmings, as in the butchering of hogs, the manufacture of lard may also constitute an important phase of the factory operations. Moreover, for a variety of reasons not germane to the present disclosure, lard produced by the so-called "wet rendering" process, to be hereinafter described, is generally preferred by housewives, bakers and other consumers.

In the manufacture of lard by the "wet rendering" process, a certain amount of the commercially valuable proteinaceous materials generally become separated from the lard and are customarily lost in the form of waste products. As a matter of fact, at the present time it is common practice in the industry to dispose of one of the very good sources of protein, namely the stick water, by running it into the sewer at the completion of the rendering operation.

Accordingly, the principal object of the present invention is to provide an improved method of treating packing house products in such manner as to reduce to a practical minimum the loss of valuable protein materials resulting from various packing house operations.

Another object of the invention is to provide an improved method of increasing the protein content of the residue obtained in the manufacture of lard by the "wet rendering" process.

A further object is to provide an improved animal feed obtained as a by-product in the manufacture of lard and having an enhanced protein content.

The foregoing, as well as other and further objects and advantages of the invention, together with a clearer understanding of the precise nature thereof, will become more readily apparent to one skilled in the art from a consideration of the following detailed specification taken in conjunction with the accompanying sheets of drawings wherein:

Figure 1 is a fragmentary perspective view largely schematic in nature and illustrating a preferred plant arrangement of certain of the more important items of equipment employed in the practice of the present invention; and Figure 2 is a diagrammatic flow sheet in which both method steps and resultant products have been represented in order to illustrate the various stages of the preferred process in accordance with the present invention.

As mentioned above, the principal commercial products of the ordinary meat packing house comprise the various dressed cuts and cooked meat products which are prepared and sold for human consumption and which consist predominantly of lean meat. However, in the butchering of pigs there is a relatively large amount of edible fat separated from the lean meat cuts in the form of scraps and trimmings, as well as a considerable amount of skin, bones, blood, feet and the like, which contain valuable proteins, but which are not susceptible of direct sale for human consumption. It is customary, therefore, to collect together the various edible fats as well as certain bones which have an edible fat content and to render these substances in order to convert the fats into lard which constitutes an important by-product of the factory operations. The present invention is concerned particularly with the treatment of the residues obtained in the manufacture of the lard by a particular process known as "wet rendering," and specifically, seeks to reclaim and save some of the proteinaceous materials which are customarily thrown away after the rendering of the lard.

Referring now in somewhat more detail to the drawings, and in particular, to Figure 1, thereof, there is illustrated a largely schematic plant layout which has been considerably simplified over the arrangement actually used in practice, but which, nevertheless, illustrates the more important items of equipment which may be employed in accordance with the teachings of the present invention. In this figure, a cross section has been taken through one end of a packing house plant or factory, particularly showing the rooms or spaces devoted to the manufacture of lard; these spaces comprise a basement 10, a first floor 12, and a second floor designated generally by reference numeral 14. An additional upper compartment 16 has been shown which may contain the usual blow tank, gut hasher, or the like, but as these conventional items of equipment per se do not enter into the present invention, they have been omitted along with numerous other items from the present disclosure.

The basement section 10 is adapted to contain a plurality of relatively large settling tanks 18, 20 and 22, into which the rendered lard may be run for settling and storage. The rendered lard is obtained initially from a series of lard tanks designated generally by reference numeral 24, each of which is provided with an inverted conical bottom portion 26 in which are collected the non-fat or insoluble solids at the completion of the rendering operation. The tops 28 of the lard tanks 24 are preferably mounted in the structure of the flooring 30 of the second floor chamber 14, and the usual manholes or the like 32 are indicated schematically in the tops 28. It will be understood that the openings 32 are provided with relatively heavy, pressure-tight heads (not shown) and in accordance with the usual practice, these heads may be removed completely or securely mounted in place as by means of dogs, stud bolts, or the like. The manhole openings 32 are also provided with the usual pressure nipples, valves, couplings, and other fittings required for the admission of steam to the tanks, but since the arrangement of these fittings is well known in the art and since, per se, they form no part of the present invention, they have been omitted from the disclosure in the interests of clarity.

Mounted within the second floor chamber 14 adjacent the tops 28 of the lard tanks 24, is a steam header 34. The steam header 34, as shown, is provided with branch lines 36, each of which includes a manually-operable control valve 38 for regulating the admission of steam through the heads into the interior of the lard tanks 24. The representation here in Figure 1 is entirely schematic, since any suitable type of steam lines and fittings may be employed, and in practice, flexible connections are generally to be preferred so that the connections may be made and unmade with a minimum of difficulty.

Referring again to the basement section or space 10 as shown in Figure 1, it will be noted that a cat-walk 40 is preferably constructed around the assembly or bank of lard tanks 24 so that a workman may have ready access to the central portions of the latter. Such access is desirable principally for the reason that the discharge of lard from the tanks 24 is effected through conduits 42 which are connected as at 44 to the central portions of the lard tanks 24 and which discharge as at 46 into the lard tank 18. Suitable valves as designated by reference numeral 48 are provided in the conduits 42, although it is to be clearly understood that these valves may be located in any convenient position and may take any of a variety of forms which are per se well known in the art.

Referring again to the basement section 10 of Figure 1, it will be noted that the inverted conical end sections 26 of the lard tanks 24 are provided with relatively short but large-diameter discharge conduits or lines 50, each of which contains a control valve 52 which is preferably of the quick-opening type. The conduits 50, in turn, are connected to large-diameter headers 54 which join together upwardly to form a single header 56 leading to the second floor chamber 14. The conduits 50, headers 54 and 56, and the quick-opening valves 52, together constitute an eduction system which is employed in blowing from the lard tanks 24 the solid residue which collects in the conical end sections 26 at the end of a rendering operation. The upper end of the header 56 is provided with a discharge spout 58 which may be moved into various adjusted positions within the second floor space 14. As shown in Figure 1, the adjustment of the discharge position of the spout 58 is effected by means of a pair of swivel joints 60 and 62 operating in conjunction with telescopically-arranged tubing sections 64 and 66, although it will be understood that any suitable type of adjustable discharge spout, such as a flexible hose or the like, may be provided.

The basement section 10 also contains a number of smaller lines comprising a fluid circuit which is adapted to handle either fresh water from the usual public mains or stick water which may be transferred throughout the system under pressure. This fluid circuit includes a pair of liquid conduits 68 and 70 connected to the respective lard tanks 24 by means of short tubing sections 72 provided with control valves 74 therein. At one end, the lines 68 and 70 are connected to the tank 20, and a pair of cross-connecting lines 76 and 78 is provided, together with an outlet 80 and an inlet 82 so that the flow of fluid through the system may be directed in various ways by means of a plurality of control valves 84. A fluid pump 86 is adapted to be mounted on a stand or base 88 adjacent the tank 20, and may be driven by a suitable electric motor or the like 90 in order to force the fluid through the system under pressure. A transfer line or conduit 92 extends upwardly from the pump 86 and includes a control valve 94 which may be opened to permit fluid under pressure to flow upwardly to the second floor chamber 14. The function of the pumping apparatus referred to briefly herein and illustrated very schematically in the drawing will be hereinafter more fully explained in connection with the description of the operation of the apparatus, and it is to be understood that the specific details of the fluid pipes and valving arrangements may be varied in any convenient manner, since they do not, per se, constitute a part of the present invention.

Referring now to the upper right-hand portion of Figure 1, it will be noted that the first floor space 12 is adapted to contain a plurality of horizontal cylindrical tanks designated generally by reference numeral 96, which may assume a variety of forms but are preferably of the type known in the art as "dry melters" or in a specialized form, as "blood driers." As shown in Figure 1, each of these cylindrical tanks 96 comprises an outer cylinder 98 and an inner cylinder 100, leaving a space 102 therebetween. In operation, steam under pressure is admitted to the space between the outer jacket 98 and the inner cylinder 100 as by means of a steam header 104 having short connecting pipes 106 provided with suitable control valves therein. The interior of the inner cylinder 100 preferably includes a suitable mechanism for effecting agitation of the contents thereof, and as shown in Figure 1, this mechanism may take the form of a rotatable shaft 108 having a plurality of arms 110 secured thereto and rotated as by means of an externally-mounted electric motor or the like 112.

In order to provide access to the interior of the inner cylinders 100 of the dry melters or blood driers 96, each of the latter includes an upwardly extending large-diameter inlet tube 114 having its upper end secured in the structure of the floor 30, and provided with a suitable cover or head 116. It will be understood that the heads 116 are removably secured in place on the tubes 114 so that various materials may be passed therethrough into the dry melters 96. It will also be understood that the usual pressure nipples, valves, couplings and other fittings (not shown) are provided on the heads 116 for connection to the depending branch conduits 118 of the header 120 which, in turn, is connected as by means of a horizontal conduit 122 to the transfer pipe or conduit 92. The branch pipes 118 are also preferably provided with control valves 124 for regulating the admission of fluid from the conduit 92 to the interior of the dry melters 96. As shown at the upper right-hand corner of Figure 1, a hydraulic press 126 is also mounted adjacent the delivery ends of the dry melters 96 for a purpose which will be hereinafter more fully explained.

Referring now to Figure 2, there is illustrated schematically a flow sheet setting forth the more important steps and products employed in utilizing the apparatus hereinabove set forth in accordance with the principles of the present invention. In the operation of this apparatus, it will be understood that the principal raw materials constitute the animals such as pigs, steers or the like, which are driven to the killing rooms and there slaughtered, dehaired and butchered to separate the edible portions of the animals from the inedible portions thereof. The principal inedible products from the slaughtering operation constitute the blood and bones which may be directly fed into "blood driers" such as those designated by reference numeral 96 in Figure 1, and after thorough mixing and dehydrating in the "blood driers," the resultant materials may be bagged and disposed of commercially as fertilizer. There are, of course, certain other inedible products, such as rejected animal carcasses, which may be utilized in the practice of the present invention, but which are not generally added to the inedibles used in the manufacture of fertilizer for the reason that this would increase the fat content unduly. The fertilizer is thus usually produced directly from the dried blood and bones which have a relatively high ammonia content, but as will be apparent hereinafter, a portion of these inedibles as well as rejected carcasses or the like, may also be utilized in the practice of the present invention.

Referring again to Figure 2, the principal edible substances which are segregated following the slaughtering operation constitute the various lean meat products, including the finished cuts and cooked or smoked items sold directly for human consumption, as well as the edible fats and some fat-containing bones with which the present invention is particularly concerned. After the slaughtering operation, the edible fat scraps and trimmings are dumped into the lard tanks 24 through the manhole openings 32 which are then sealed and live steam is then admitted from the header 34 through the branch conduits 36. The steam thus admitted is usually at a pressure of somewhere between 40 and 80 pounds per square inch, and a pressure of 60 pounds per square inch has been found to be most desirable for this purpose. The cooking operation usually lasts for around three to four hours, although it is not unusual to require five hours in the case of a low pressure cooker. The name "wet rendering" is applied to this process for the reason that the steam is admitted directly into the tank and comes into intimate contact with the fat scraps and trimmings therein. On the other hand, in a "dry rendering" process, the fat is rendered to lard in a closed and jacketed container in such a way that there is no direct contact between the steam or other heating medium and the scraps and trimmings. As mentioned hereinbefore, the preparation of lard by the "wet rendering" process is of considerable commercial importance for the reason that the finished product is generally conceded to be superior in many respects to that produced by the "dry rendering" process.

After the scraps and trimmings have been cooked in the lard tanks 24 a sufficient length of time to render the fat into lard, the steam is turned off and the liquid lard is drawn off at approximately the mid-point of the tanks by means of gravity and transferred to storage tanks where it may settle and cool. As shown in Figure 1, the lard from the tanks 24 will be discharged through the openings 44 and pipes 42 under the control of valves 48 into the storage or settling tank 18. After the lard above the outlets 44 has been drawn off by gravity, the lard tanks 24 are then "raised" by admitting fluid of a heavier specific gravity to the bottom of the tank, thereby gradually raising the lard upwardly so that it may discharge through the openings 44.

Upon the completion of the tank raising operation, there remains in the lard tanks 24 a soupy liquid residue which is relatively high in protein content and which is commonly known in the art as "tank water" or "stick water." In the performance of the tank-raising operation in accordance with prior methods in common use, it has been customary to employ hot water from the usual city mains under the normal main pressure. The resultant stick water or tank water was then disposed of simply by throwing it away or running it down into the sewer system, thereby wasting all of the proteinaceous materials contained therein. In accordance with the present invention, however, this stick water is collected through the piping circuit 68 and 70 and is stored in one of the tanks 20 usually used to receive lard. Although it may sometimes be desirable in raising a plurality of the lard tanks 24 to employ clean, hot water for only the first tank, it has been found to be preferable to raise each of the tanks with stick water from the tank 20 which has been stored from a previous operation and which may be heated and supplied to the lard tanks 24 by means of the pump 86 after proper manipulation of control valves 84. Such use of heated stick water stored from a previous operation for the purpose of raising the lard tanks is, in itself, believed to be highly novel and to constitute an important feature of the present invention.

In order to prepare the stick water for subsequent use, it is preferably first evaporated to reduce its moisture content, and in normal practice, such evaporation may be carried out from an original viscosity of approximately 6 degrees Baumé to a final viscosity of approximately 25 degrees Baumé, or generally to the consistency of heavy molasses. Although such evaporation may, of course, be carried out by means of conventional evaporator equipment, for example, that of the multi-stage type, I have found it to be most desirable to carry out the evaporation of the stick water directly in the dry melters. In this way, it is not only unnecessary to provide additional and quite expensive equipment, namely the evaporators, but it is also possible to utilize the dry melters during a time when they would otherwise be standing idle in accordance with usual packing house procedure. Thus, in the present case, the stick water from the tank 20 is preferably pumped through the conduits 92, 122, and 120 into one of the dry melters 96, and steam is admitted to the jackets surrounding the dry melter and evaporation carried out with progressive or periodic additions of fresh stick water from the tank 20.

In a typical operation, and in order that a specific example may be set forth, it has been found in practice that a single 20,000-pound lard receiver constitutes a suitable storage tank for the fresh stick water resulting from the wet rendering of lard in the tanks 24. In an installation of this size, the pump 86 need not be larger than a 90-gallon pump, and by suitable cross-connections, the same pump may be used both for tank raising and for pumping the stored stick water to the dry melters. A single melter having a capacity of approximately 12,000 pounds of tank water may be operated under a vacuum of around five inches of mercury with periodic additions of fresh tank water from time to time, until the evaporation has been completed to the aforementioned 25 degree Baumé consistency. Normally, and with a total "kill" of around 2,100 or 2,200 hogs per day, the evaporation in a single dry melter may be completed in around six hours, and furthermore, may be done at night when the melters would otherwise normally be idle.

It would be possible, of course, to pump a proportionate amount of tank water into each of the idle melters in the bank, but since this involves considerably more accurate timing of the preceding operations, it is usually preferable to evaporate all of the stick water in a single dry melter. A 5 by 12-foot melter which has been filled three-quarters full of tank water of approximately 5 degree Baumé viscosity can be evaporated to produce around eleven inches of 25 degree Baumé "stick," or approximately 100 pounds thereof in around three and one-quarter hours. If all of the dry melters are dumped and available for use in evaporating the tank water, it would be preferable to perform the evaporation operation by utilizing all of the melters, as this would obviate the necessity of pumping the viscous stick from the evaporating melters to the other melters of the bank later on. However, as mentioned above, the timing of this operation is quite important, and since all of the dry melters of a bank are usually not available at the same time, it has been found preferable in practice to perform the evaporation of the tank water in a single melter.

It may be noted in passing that the dry melters are generally operated at slightly above atmospheric pressure or somewhere in the neighborhood of 35 pounds per square inch pressure, and furthermore, generally employ steam at a higher pressure, namely around 80 pounds per square inch, as compared with the 60 pound per square inch steam generally used in wet rendering. One result of utilizing the higher pressure and therefore higher temperature steam in the dry melters is that rejected carcasses which have been set aside as unfit for animal consumption may be utilized after processing in the dry melters, since the higher temperature is effective to kill any disease germs or bacteria which may be present.

After the protein containing stick water or tank water has been evaporated to the viscous syrupy-like substance known as "stick," it is divided up and proportionate amounts are placed in each of the dry melters. The protein content of this material may then be still further increased by the addition of certain inedible products previously referred to, such as blood and bones, whether dried or in natural state. Preferably, however, the next step in the operation comprises mixing the evaporated stick with a certain amount of material known as "wet tankage" which comprises the insoluble residue remaining in the lard tanks 24 after the wet rendering operation. As shown in Figure 1, this wet tankage collects in the inverted conical end portions 26 of the lard tanks 24, and after the tanks have been raised and drawn, the tankage may be "blown" by opening the quick-acting valves 52 and admitting high-pressure steam to the heads 32. The tankage passes through the eduction system, including the conduits 54 and 56, to the outlet nozzle 58, and the latter may be adjustably positioned within the second floor space 14 so as to discharge successively into the inlet pipes 114 of the various dry melters 96.

By referring to the lower left-hand portion of Figure 2, it will be noted that after the tank raising operation, the lard is collected together in one of the tanks such as 18 or 22, and is there permitted to settle in order that any remaining solids or insoluble impurities may be separated from the lard. After the lard has settled, of course, it may be further processed, and many packing houses do treat the lard as by bleaching, filtering, chilling, aerating, and the like, in order to obtain certain desired qualities in the finished product, although other packing houses perform substantially no further operations whatsoever upon the lard. In accordance with the present invention, after the lard has settled, the residue is skimmed to remove the grease therefrom and the sludge may then be added directly to the dry melters along with the wet tankage, evaporated stick water, and possibly some additional inedibles such as blood and bones. Thereafter, the dry melters are closed and relatively high-pressure, high-temperature steam is admitted to the jackets while the mixture is preferably continuously agitated as by means of the rotatable shafts 108 and arms 110 which are operated by the motors 112.

In the specific example referred to above, the evaporation of stick water in a single dry melter will produce approximately 5,000 pounds of stick for each 2,000 hogs. Accordingly, if a total of five melters are to be employed in the further operations, 1,000 pounds of stick will be pumped to each of the other melters, which may then be loaded with the regular type product, including inedible fat, head bones, feet and the like, as well as the other materials referred to above. Preferably, the power of the motors used with 5 by 12-foot dry melters should be increased from 15 to 30 H. P., in order to provide for the increased load resulting from the above mixture, although in practice, I have found that it is possible to use the regular 15 H. P. motors, provided very careful watch is maintained during the operation, particularly at the peak or critical period of the maximum load.

After the mixture of stick, together with one or several of the ingredients comprising wet tankage, sludge, and inedible products, has been thoroughly cooked and agitated, the resultant granular product known as "crackling" is removed from the dry melters and pressed under relatively high pressure as, for example, in the hydraulic press indicated by reference numeral 126 in Figure 1. This pressing operation further removes most of the grease remaining in the material, and produces a rather hard, solid block which is known as the "cake." This product, the cake, is in a form which is commonly sold commercially for use as animal feed, and in the present case, it will be particularly noted that in the resultant product the stick is incorporated in the cake, thereby appreciably enhancing its protein content. Actually, of course, even after pressing, the cake may still contain somewhere around 8 per cent of fat which would be undesirable in the case of a fertilizer, but which is entirely satisfactory insofar as an animal feed product is concerned.

Obviously, numerous modifications, alterations and deviations from the specific structures and arrangements disclosed herein as a preferred embodiment solely for the purpose of illustration, will occur to one skilled in the art, without departing from the principles of the invention. Also, while only a single preferred embodiment of apparatus has been described in detail, it is to be understood that numerous changes can be made in size, materials and arrangement of parts, and that variations from the precise sequence of steps set forth may be resorted to without departing from the principles of the invention as set forth in the appended claims.

Having thus described my invention, what I claim as novel and desire to secure by Letters Patent of the United States is:

1. A method of treating packing house products comprising, wet rendering the edible fat scraps and trimmings from the kill with live steam at approximately sixty pounds per square inch pressure for around three to four fours, drawing and raising the lard tanks with hot, clean stick water stored from a previous operation, refining the lard by settling and thereafter skimming to separate the grease from the sludge, progressively evaporating the stick water in a dry melter under a vacuum of approximately five inches of mercury from a viscosity of approximately six to twenty-five degrees Baumé with live steam at approximately eighty pounds per square inch pressure and with periodic additions of stick water until completion, blowing the lard tanks with live steam, mixing the blown wet tankage and lard sludge with the evaporated stick water in dry melters, adding inedible fats, blood and bones to the mixture, cooking the mixture in the dry melters at approximately thirty-five pounds per square inch pressure with live steam at approximately eighty pounds per square inch pressure with continuous agitation, and pressing the crackling to remove the grease therefrom and to form a cake of enhanced protein content having the stick therein.

2. A method of treating packing house products comprising, wet rendering the edible fat scraps and trimmings from the kill with live steam at approximately sixty pounds per square inch pressure for around three to four hours, drawing and raising the lard tanks with hot, clean stick water stored from a previous operation, refining the lard by settling and thereafter skimming to separate the grease from the sludge, progressively evaporating the stick water in a dry melter under a vacuum of approximately five inches of mercury from a viscosity of approximately six to twenty-five degrees Baumé with live steam at approximately eighty pounds per square inch pressure and with periodic additions of stick water until completion, blowing the lard tanks with live steam, mixing the blown wet tankage and lard sludge with the evaporated stick water in dry melters, cooking the mixture in the dry melters at approximately thirty-five pounds per square inch pressure with live steam at approximately eighty pounds per square inch pressure with continuous agitation, and pressing the crackling to remove the grease therefrom and to form a cake of enhanced protein content having the stick therein.

3. A method of treating packing house products comprising, wet rendering the edible fat scraps and trimmings from the kill with live steam, drawing and raising the lard tanks with hot, clean stick water stored from a previous operation, refining the lard by settling and thereafter skimming to separate the grease from the sludge, progressively evaporating the stick water in a dry melter from a viscosity of approximately six to twenty-five degrees Baumé with live steam with periodic additions of stick water until completion, blowing the lard tanks with live steam, mixing the blown wet tankage and lard sludge with the evaporated stick water in dry melters, cooking the mixture in the dry melters with live steam and with continuous agitation, and pressing the crackling to remove the grease therefrom and to form a cake of enhanced protein content having the stick therein.

4. A method of treating packing house products comprising, wet rendering the edible fat scraps and trimmings from the kill with live steam, drawing and raising the lard tanks with hot, clean stick water stored from a previous operation, progressively evaporating the stick water in a dry melter from a viscosity of approximately six to twenty-five degrees Baumé with live steam and with periodic additions of stick water until completion, blowing the lard tanks with live steam, mixing the blown wet tankage with the evaporated stick water in dry melters, cooking the mixture in the dry melters with live steam and with continuous agitation, and pressing the crackling to remove the grease therefrom and to form a cake of enhanced protein content having the stick therein.

5. The method of increasing the protein content of the residue obtained as a by-product in the manufacture of lard by the wet rendering process which comprises, drawing and raising the lard tanks with hot, clean stick water stored from a previous operation, progressively evaporating the stick water in a dry melter with periodic additions of stick water until completion, blowing the lard tanks with live steam, mixing the blown wet tankage with the evaporated stick water in dry melters, cooking the mixture in the dry melters with live steam and with continuous agitation, and pressing the crackling to remove the grease therefrom and to form a cake of enhanced protein content having the stick therein.

6. The method of increasing the protein content of the residue obtained as a by-product in the manufacture of lard by the wet rendering process which comprises, drawing and raising the lard tanks with hot, clean stick water stored from a previous operation, progressively evaporating the stick water in a dry melter with periodic additions of stick water until completion, mixing the wet tankage with the evaporated stick water in dry melters, cooking the mixture in the dry melters with live steam and with continuous agitation, and pressing the crackling to remove the grease therefrom and to form a cake of enhanced protein content having the stick therein.

7. The method of increasing the protein content of the residue obtained as a by-product in the manufacture of lard by the wet rendering process which comprises, drawing and raising the lard tanks with hot, clean stick water stored from a previous operation, progressively evaporating the stick water in a dry melter with periodic additions of stick water until completion, mixing the wet tankage with the evaporated stick water in dry melters, cooking the mixture in the dry melters with live steam and with continuous agitation, and removing the grease from the crackling to form a cake of enhanced protein content having the stick therein.

8. The method of increasing the protein content of the residue obtained as a by-product in the manufacture of lard by the wet rendering process which comprises, drawing and raising the lard tanks with hot, clean stick water stored from a previous operation, evaporating the stick water, mixing the wet tankage with the evaporated stick water in dry melters, cooking the mixture in the dry melters with live steam and with continuous agitation, and removing the grease from the crackling to form a cake of enhanced protein content having the stick therein.

9. The method of increasing the protein content of the residue obtained as a by-product in the manufacture of lard by the wet rendering process which comprises, drawing and raising the lard tanks with water, evaporating the stick water, mixing the wet tankage with the evaporated stick water in dry melters, cooking the mixture in the dry melters with live steam and with continuous agitation, and removing the grease from the crackling to form a cake of enhanced protein content having the stick therein.

10. The method of increasing the protein content of the residue obtained as a by-product in the manufacture of lard by the wet rendering process which comprises, drawing and raising the lard tanks with water, evaporating the stick water, mixing the wet tankage with the evaporated stick water in dry melters, cooking the mixture in the dry melters with live steam, and removing the grease from the crackling to form a cake of enhanced protein content having the stick therein.

11. The method of increasing the protein content of the residue obtained as a by-product in the manufacture of lard by the wet rendering process which comprises, raising the lard tanks, evaporating the stick water, mixing the wet tankage with the evaporated stick water, cooking the mixture, and removing the grease from the crackling to form a cake of enhanced protein content having the stick therein.

12. The method of increasing the protein content of the residue obtained as a by-product in the manufacture of lard by the wet rendering process which comprises, raising the lard tanks, evaporating the stick water, mixing the wet tankage with the evaporated stick water, and cooking the mixture to form a cake of enhanced protein content having the stick therein.

HAROLD K. GILLMAN.

REFERENCES CITED

The following references are of record in the file of this patent:

UNITED STATES PATENTS

| Number | Name | Date |
|---|---|---|
| 1,186,510 | Eldredge | June 6, 1916 |
| 1,516,952 | Brune | Nov. 25, 1924 |
| 1,524,233 | Berrigan | Jan. 27, 1925 |
| 1,791,439 | Allbright | Feb. 3, 1931 |
| 1,833,826 | Cullen | Nov. 24, 1931 |
| 2,193,871 | Hanno | Mar. 19, 1940 |